United States Patent
Trocciola et al.

[11] Patent Number: 5,830,423
[45] Date of Patent: Nov. 3, 1998

[54] WASTE GAS TREATMENT SYSTEM

[75] Inventors: John C. Trocciola, Glastonbury; Roger R. Lesieur, Enfield; John L. Preston, Jr., Hebron; Richard A. Sederquist, Newington, all of Conn.

[73] Assignee: International Fuel Cells Corp., S. Windsor, Conn.

[21] Appl. No.: 561,684

[22] Filed: Nov. 22, 1995

[51] Int. Cl.⁶ .............................. C01B 7/00; B01J 8/00; B01D 53/34

[52] U.S. Cl. .............................. 423/244.09; 423/244.1; 423/240 R; 422/168; 422/169; 422/170; 422/171; 48/127.3; 95/117; 95/131; 95/135; 95/286; 96/136

[58] Field of Search ................. 422/168–171; 423/244.09, 244.1, 230, 240 R, 563, 210; 588/206, 900; 405/128, 129; 429/17, 19; 48/127.3; 95/117, 122, 131, 135, 136, 148, 286; 96/122, 127, 130, 132, 133, 136, 144

[56] References Cited

U.S. PATENT DOCUMENTS

| | | | |
|---|---|---|---|
| 4,545,976 | 10/1985 | Osman | 423/650 |
| 5,059,405 | 10/1991 | Watson et al. | 423/210 |
| 5,451,249 | 9/1995 | Spiegel et al. | 95/117 |

*Primary Examiner*—Hien Tran
*Attorney, Agent, or Firm*—William W. Jones

[57] ABSTRACT

The gas stream which is produced in and emanates from landfills, anaerobic digesters and other waste gas streams, is treated to produce a purified gas which is essentially a hydrocarbon such as methane and which can be used as the fuel source in a fuel cell power plant. The gas stream passes through a simplified purification system which removes essentially all of the sulfur compounds, hydrogen sulfide, and halogen compounds from the gas stream. The resultant gas stream can be used to power a fuel cell power plant which produces electricity, or as a hydrocarbon fuel gas for other applications.

12 Claims, 1 Drawing Sheet

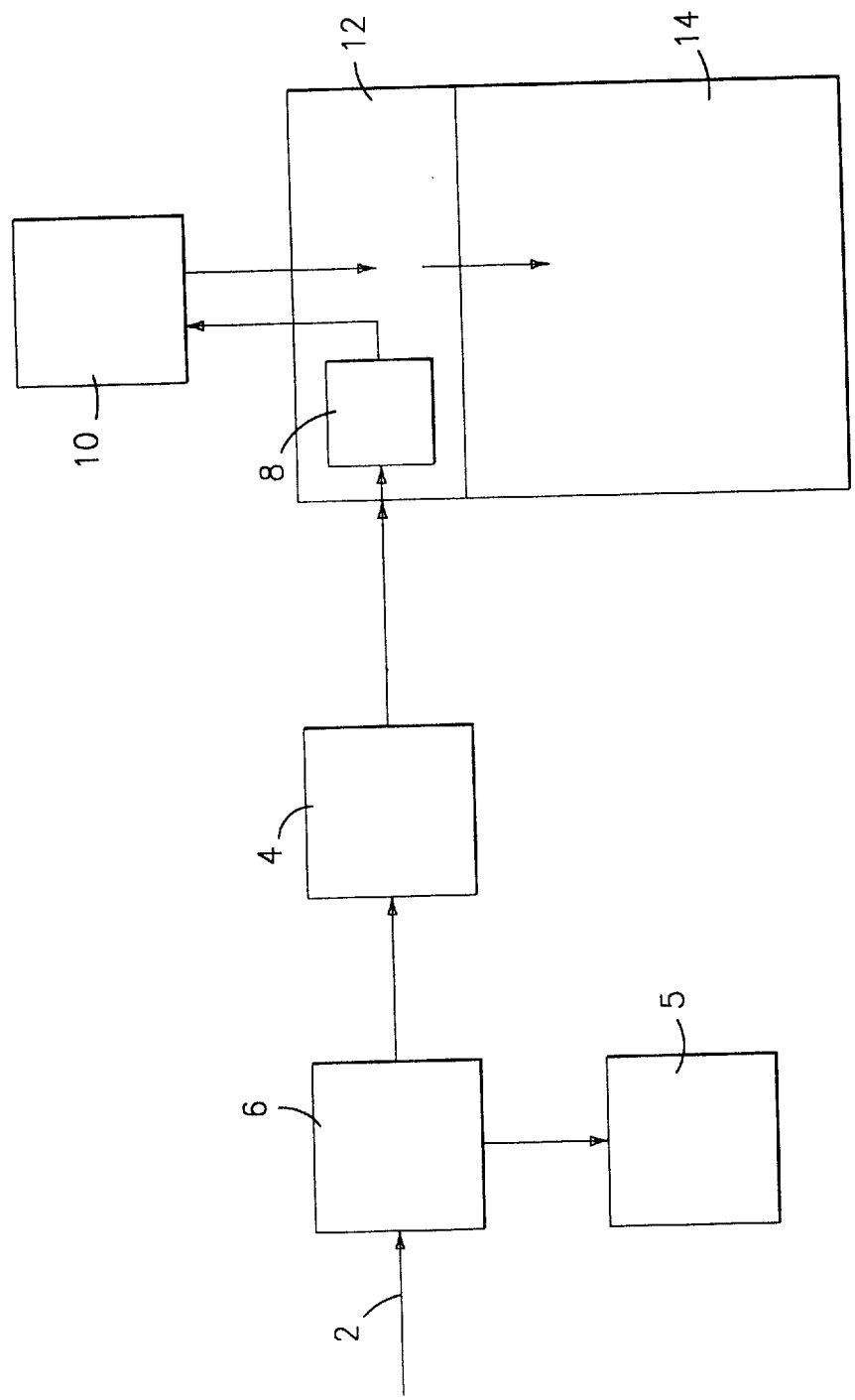

WASTE GAS TREATMENT SYSTEM

TECHNICAL FIELD

This invention relates to a system for treating waste gas streams to purify the same and render it cleanly combustible. More particularly, this invention relates to a landfill gas treatment system which can render the landfill gas usable as a hydrogen source for a fuel cell power plant.

BACKGROUND

Man-made landfills and anaerobic digesters are the source of gas effluents which pass into the atmosphere. These gases are commonly referred to as "waste" gases. The major components of waste gas are methane, carbon dioxide and nitrogen. There are also minor amounts of oxygen, other volatile organic compounds, halides and hydrogen sulfide. Waste gases which present a potential energy source, presently constitute little more than a nuisance and a potential environmental hazard, and the carbon dioxide and methane contribute to the green house effect. At present, landfill gas has been dealt with by venting to the atmosphere; burning in boilers; flaring; fueling internal combustion engines or generators; or as a natural gas substitute after the $CO_2$ is removed therefrom.

Landfill gas is seen to be a potential source of carbon dioxide, and also as a potential source of natural gas. U.S. Pat. No. 5,059,405 granted Oct. 22, 1991 to R. J. Watson et al discloses a process for purification of landfill gas to recover carbon dioxide therefrom. The process described therein involves the removal of impurities such as sulfur compounds, halogens, water, and the like. After removal of the aforesaid impurities, the remaining gas is incinerated in a boiler/incinerator combustion furnace to produce an exit stream of essentially pure carbon dioxide. In this process, the combustible methane component of the landfill gas is simply incinerated.

An article published in the March, 1993 issue of Gas Separation and Purification (Vol. 7, No. 1), pages 31–37 by R. Rautenbach et al describes the treatment of landfill gas by converting $H_2S$ to sulfur in a burner. The sulfur is then transported to a bed of carbon wherein the sulfur is deposited. A problem attendant to this system is that the sulfur can deposit in the transfer lines and can cause a pressure drop in the system to increase. The water in the system is removed by a refrigerator. Halogen compounds are absorbed on carbon. The carbon is regenerated by steam which results in an environmentally polluting aqueous mixture of water and halogen.

DISCLOSURE OF THE INVENTION

This invention relates to a system for removing chemical contaminants from landfill gas, or other contaminated waste gas sources, to produce a fuel gas that is suitable for use as a fuel source in a fuel cell power plant, a combustion turbine, reciprocating engine, or for conversion into gas which may be put into a natural gas pipeline. The waste gas collection method will be determined by the specific system requirements. Landfill gas is collected from a landfill by drilling gas collection wells in the landfill, and pumping the landfill gas from the wells into a collection pipeline which leads to the treatment system of this invention. A collected waste gas is fed into a hydrogen sulfide adsorber which may be carbon impregnated with potassium hydroxide which removes the hydrogen sulfide by means of the following chemical reaction:

$$H_2S + 0.5O_2 \rightarrow H_2O + S;$$

wherein the sulfur produced is adsorbed onto the adsorbent bed. The desulfurized gas stream is then fed into a hydrogenating hydrodesulfurizing station wherein halides and sulfur in the gas stream are converted into $H_2S$; and HX, wherein "X" is chlorine, fluorine, bromine or iodine. The $H_2S$ constituent is removed from the gas stream by passing the gas stream over a zinc oxide bed wherein the $H_2S$ is converted to ZnS and $H_2O$. The hydrogenating station and zinc oxide bed are conventional components of a fuel cell power plant which uses pipe line natural gas as a fuel source.

The gas stream is then fed through a halogen removal bed which may include sodium hydroxide and/or calcium hydroxide, where the HX halogen compounds are removed from the gas stream. The gas stream is then passed into the steam reformer of a fuel cell power plant. The purified and reformed gas stream thus produced is fed into the cells of a conventional fuel cell power plant to provide hydrogen to the fuel cells for generating electrical power. In certain cases, a gas stream cooler/condenser station can be included to remove water from the waste gas stream. The halogen and $H_2S$ removal beds will typically be beds which are periodically removed and replaced with fresh adsorption chemicals.

It is therefore an object of this invention to provide a waste gas treatment system which is operable to purify waste gas to the extent needed to use the purified waste gas as a clean energy source for a fuel cell power plant, gas turbine, gas pipeline, or the like.

It is an additional object of this invention to provide a waste gas treatment system of the character described which is operable to utilize conventional components of a fuel cell power plant to help purify the waste gas stream.

It is a further object of this invention to provide a waste gas treatment system of the character described which has minimal pretreatment stations, and is capital cost effective.

It is another object of this invention to provide a waste gas treatment system of the character described which is environmentally compatible.

BRIEF DESCRIPTION OF THE DRAWINGS

These and other objects and advantages of this invention will become more readily apparent from the following detailed description of a preferred embodiment of the invention when taken in conjunction with the accompanying drawing which is a schematic drawing of a landfill gas or other waste gas treatment facility formed in accordance with this invention.

SPECIFIC EMBODIMENT OF THE INVENTION

Referring now to the drawing, there is shown an embodiment of a landfill gas treatment system or facility that is capable of converting a landfill gas stream to a gas stream that can be used to provide a hydrogen fuel gas source for a fuel cell power plant. The gas treatment system includes a landfill gas inlet line 2 which passes a stream of raw landfill gas from the landfill into a hydrogen sulfide adsorption station 4. The nominal primary components (and their ranges) of the raw landfill gas are: methane (42–50%); carbon dioxide (38–48%); nitrogen (10–20%); oxygen (0.3–1%); water vapor (1–5%); plus trace, but significant, amounts of hydrogen sulfide; and hydrocarbons including sulfur-containing and halogenated hydrocarbons. The adsorption station 4 can be a packed bed which may include adsorption materials such as potassium hydroxide-impregnated carbon; zinc oxide; and/or other conventional $H_2S$ adsorbents, which facilitate sulfur adsorption and convert $H_2S$ into sulfur or sulfur compounds. The adsorption beds are not regenerable on site, and must be removed and replaced with fresh adsorption beds periodically.

In certain cases when the landfill gas stream is determined to be undesirably humid, a cooler condenser station 5, 6 which operates at a temperature that is slightly above the freezing point of water, preferably about 33° to 35° F., can be included in the system to condense the water vapor and some of the heavier hydrocarbon fractions out of the gas stream. The cooler condenser station 5, 6 is preferably a conventional shell and tube heat exchanger.

The gas stream is then passed through a hydrogenation catalyst station 8, which is connected to an $H_2$ recycling line (not shown) from the power plant, in which station 8 the halogens and sulfur remaining in the gas stream are converted to HX and $H_2S$, and wherein the resultant $H_2S$ is removed in a zinc oxide bed. The station 8 is a conventional component of any fuel cell power plant which uses pipe line natural gas, the station 8 being commonly used to remove sulfur odorant compounds found in pipe line natural gas. The HX halide compounds are removed from the gas stream in a discardable halogen removal bed 10, which may be a bed of sodium hydroxide, calcium hydroxide, or the like. The gas stream is passed into the fuel cell power plant steam reformer 12 and thence into a fuel cell power plant 14 where it is used as a hydrogen source for the power plant.

While the aforesaid gas purification system utilizes components of a fuel cell power plant, it will be readily appreciated that these specific components may be included in a system formed in accordance with this invention, which system does not include a fuel cell power plant, and which system is used to purify the gas stream for uses other than as a fuel for a fuel cell power plant. The system of this invention is formed from commercially available individual components which, when combined as described above, will convert landfill gas to a usable natural gas which can be used as the fuel source for an acid or other fuel cell power plant. The system may be erected at a landfill or other waste gas site and combined with a power plant built on the site. Adsorption beds which are included in the system may be replaced when spent and regenerated off site. The system thus converts a landfill effluent, or other waste gas stream, which is presently deemed to be at best a nuisance, into a useful product in an environmentally compatible manner. The system and equipment of this invention can be used to purify essentially any gas which is formed in a typical waste gas site. It will be readily appreciated that the simplified system of this invention does not require sophisticated control software, does not require extensive pretreatment "plumbing", and can utilize conventional components of a fuel cell power plant to aid in the removal of contaminants from the gas stream being purified.

Since many changes and variations of the disclosed embodiments of the invention may be made without departing from the inventive concept, it is not intended to limit the invention otherwise than as required by the appended claims.

What is claimed is:

1. A method of purifying waste gas containing hydrogen sulfide, organic sulfur compounds and organic halogen compounds to the extent necessary to provide fuel gas for a fuel cell power plant, said method consisting of the steps of:

a) providing a stream of the waste gas;

b) removing hydrogen sulfide from said waste gas stream to form an essentially hydrogen sulfide-free gas stream;

c) treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream;

d) removing hydrogen sulfide and HX compounds from said treated gas stream to form an essentially sulfur and halogen-free gas stream; and e) steam reforming said sulfur and halogen-free gas stream to produce a fuel gas stream which is suitable for use in a fuel cell power plant.

2. The method of claim 1 wherein said treating step is performed by adding hydrogen to said hydrogen sulfide-free gas stream in the presence of a hydrodesulfurization catalyst.

3. The method of claim 1 wherein said step of removing hydrogen sulfide and HX compounds is performed by passing the treated gas stream through a zinc oxide bed and through a halogen removal bed.

4. A method of purifying waste gas containing hydrogen sulfide, organic sulfur compounds and organic halogen compounds to the extent necessary to provide fuel gas for a fuel cell power plant, said method consisting of the steps of:

a) providing a stream of the waste gas;

b) condensing water vapor and heavier hydrocarbon fractions from said stream of waste gas to produce an essentially dry gas stream;

c) removing hydrogen sulfide from said dry gas stream to form an essentially hydrogen sulfide-free gas stream;

d) treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream;

e) removing hydrogen sulfide and HX compounds from said treated gas stream to form an essentially sulfur and halogen-free gas stream; and f) steam reforming said sulfur and halogen-free gas stream to produce a fuel gas stream which is suitable for use in a fuel cell power plant.

5. A system for purifying waste gas containing hydrogen sulfide, organic sulfur compounds and organic halogen compounds to the extent necessary to provide fuel gas for a fuel cell power plant, said system consisting of:

a) means for providing a stream of the waste gas;

b) means for removing hydrogen sulfide from said waste gas stream to form an essentially hydrogen sulfide-free gas stream;

c) means for treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream;

d) means for removing hydrogen sulfide and HX compounds from said treated gas stream to form an essentially sulfur and halogen-free gas stream; and e) means for steam reforming said sulfur and halogen-free gas stream to produce a fuel gas stream which is suitable for use in a fuel cell power plant.

6. The system of claim 5 wherein said means for treating the hydrogen sulfide-free gas stream includes a hydrodesulfurization catalyst bed.

7. The system of claim 5 wherein said means for removing hydrogen sulfide and HX compounds includes a zinc oxide bed and a halogen removal bed.

8. A system for purifying waste gas containing hydrogen sulfide, organic sulfur compounds and organic halogen compounds to the extent necessary to provide fuel gas for a fuel cell power plant, said system consisting of:
 a) means for providing a stream of the waste gas;
 b) means for condensing water vapor and heavier hydrocarbon fractions from said stream of waste gas to produce an essentially dry gas stream;
 c) means for removing hydrogen sulfide from said dry gas stream to form an essentially hydrogen sulfide-free gas stream;
 d) means for treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream;
 e) means for removing hydrogen sulfide and HX compounds from said treated gas stream to form an essentially sulfur and halogen-free gas stream; and
 f) means for steam reforming said sulfur and halogen-free gas stream to produce a fuel gas stream which is suitable for use in a fuel cell power plant.

9. A method of purifying waste gas containing hydrogen sulfide, organic sulfur compounds and organic halogen compounds to the extent necessary to provide a combustible fuel gas, said method consisting of the steps of:
 a) providing a stream of the waste gas;
 b) removing hydrogen sulfide from said waste gas stream to form an essentially hydrogen sulfide-free gas stream;
 c) treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream; and
 d) removing hydrogen sulfide and HX compounds from said treated gas stream to form an essentially sulfur and halogen-free fuel gas stream.

10. A method of purifying waste gas containing hydrogen sulfide, organic sulfur compounds and organic halogen compounds to the extent necessary to provide a combustible fuel gas, said method consisting of the steps of:
 a) providing a stream of the waste gas;
 b) condensing water vapor and heavier hydrocarbon fractions from said stream of waste gas to produce an essentially dry gas stream;
 c) removing hydrogen sulfide from said waste gas stream to form an essentially hydrogen sulfide-free gas stream;
 d) treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream; and
 e) removing hydrogen sulfide and HX compounds from said treated gas stream to form an essentially sulfur and halogen-free fuel gas stream.

11. A system for purifying waste gas containing hydrogen sulfide, organic sulfur compounds and organic halogen compounds to the extent necessary to provide a combustible fuel gas, said system consisting of:
 a) means for providing a stream of the waste gas;
 b) means for removing hydrogen sulfide from said waste gas stream to form an essentially hydrogen sulfide-free gas stream;
 c) means for treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream; and
 d) means for removing hydrogen sulfide and HX compounds from said treated gas stream to form an essentially sulfur and halogen-free fuel gas stream.

12. A system for purifying waste gas containing hydrogen sulfide, organic sulfur compounds and organic halogen compounds to the extent necessary to provide a combustible fuel gas, said system consisting of:
 a) means for providing a stream of the waste gas;
 b) means for condensing water vapor and heavier hydrocarbon fractions from said stream of waste gas to produce an essentially dry gas stream;
 c) means for removing hydrogen sulfide from said waste gas stream to form an essentially hydrogen sulfide-free gas stream;
 d) means for treating said hydrogen sulfide-free gas stream to convert organic sulfur compounds in said hydrogen sulfide-free gas stream to sulfur-free hydrocarbons and hydrogen sulfide, and to convert organic halogen compounds in said hydrogen sulfide-free gas stream to halogen-free hydrocarbons and HX halide compounds, wherein X is fluorine, chlorine, bromine or iodine, thereby forming a treated gas stream; and
 e) means for removing hydrogen sulfide and HX compounds from said treated gas stream to form an essentially sulfur and halogen-free fuel gas stream.

* * * * *